(12) United States Patent
Wu et al.

(10) Patent No.: US 9,105,101 B2
(45) Date of Patent: Aug. 11, 2015

(54) IMAGE TRACKING DEVICE AND IMAGE TRACKING METHOD THEREOF

(71) Applicant: NATIONAL TAIWAN UNIVERSITY, Taipei (TW)

(72) Inventors: Ja-Ling Wu, Taipei (TW); Jui-Hsin Lai, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 256 days.

(21) Appl. No.: 13/761,938

(22) Filed: Feb. 7, 2013

(65) Prior Publication Data

US 2014/0147000 A1 May 29, 2014

(30) Foreign Application Priority Data

Nov. 23, 2012 (TW) .............................. 101144024 A (51) Int. Cl.
*G06T 7/20* (2006.01)
(52) U.S. Cl.
CPC ................. *G06T 7/204* (2013.01); *G06T 7/208* (2013.01); *G06T 2207/20081* (2013.01)
(58) Field of Classification Search
CPC ....................................................... G06K 9/00
USPC ........................................................ 382/103
See application file for complete search history.

(56) References Cited

U.S. PATENT DOCUMENTS

| | | | |
|---|---|---|---|
| 2006/0029253 A1* | 2/2006 | Pace | 382/103 |
| 2007/0280540 A1* | 12/2007 | Ikeda | 382/195 |
| 2009/0087122 A1* | 4/2009 | Xu et al. | 382/277 |
| 2009/0110236 A1* | 4/2009 | Huang et al. | 382/103 |
| 2012/0249833 A1* | 10/2012 | Li | 348/231.99 |

FOREIGN PATENT DOCUMENTS

WO      WO 2006074289 A2 *   7/2006

* cited by examiner

*Primary Examiner* — Stephen R Koziol
*Assistant Examiner* — Delomia Gilliard (57) ABSTRACT

An image tracking device and an image tracking method thereof are provided. The image tracking device includes an image capture interface, a storage means, and a processor means. The storage means has a multi-dimensional storage space for storing a plurality of first images, each dimension of the multi-dimensional storage space being corresponding to a feature-related variance of a multi-dimensional variance. The processor means is configured to execute the following operations: marking a second image in the picture frame; calculating a multi-dimensional variance between the second image and each of the first images separately; determining whether the second image contains the object according to the multi-dimensional variance calculated; and if the second image is determined as one containing the object, storing the second image as one of the first images, in a specific subspace of the multi-dimensional storage space according to the multi-dimensional variance calculated.

18 Claims, 4 Drawing Sheets

IMAGE TRACKING DEVICE AND IMAGE TRACKING METHOD THEREOF

BACKGROUND OF THE INVENTION

1. Field of the Invention

The present invention relates to image tracking device and an image tracking method thereof, and more particularly, to an image tracking device capable of memorization and learning and an image tracking method thereof.

2. Description of the Prior Art

In recent years, due to the wide use of video products and the development of image tracking technologies, people's life now is becoming more convenient and safe. Image tracking technologies have wide application which includes traffic monitoring systems, building security and access control monitoring systems, road surveillance systems, home surveillance systems, and human facial recognition systems. With various image tracking technologies, information carried by a video and captured to serve different application-related purposes can be analyzed to identify the features, such as outline and color, of a tracked object, then determine a feature-related variance of the object in the video, and eventually keep tracking the object in the video according to the variance.

The key to image tracking is to calculate a feature-related variance of an object in a video. In general, an object undergoes translation, zooming, blur, rotation, panning, tilting, illumination, and occlusion in the course of image tracking for different reasons. Typical reasons include image noise interference, abrupt change of ambient illumination, poor lens focusing, and man-made mistakes.

Conventional image tracking technologies have a drawback as follows: the aforesaid feature-related variance of an object in a video is calculated solely with a view to determining the current advancing motion or motion trace of the object in the video. That is to say, the conventional image tracking technologies fail to enable memorization and learning of any feature-related variance of the object in the video. Hence, if the object in the video exhibits the same feature-related variance twice or more, the conventional image tracking technologies will not be effective in perceiving that the current feature-related variance thus calculated has ever happened before, and therefore the current advancing motion or motion trace of the object in the video is repeatedly determined in accordance with the feature-related variance calculated twice or more, respectively. As a result, the conventional image tracking technologies have disadvantages, namely a lengthy tracking process and a waste of available resources.

It is desired to overcome the aforesaid drawback of the conventional image tracking technologies, that is, failure to memorize and learn feature-related variances of an object in a video.

SUMMARY OF THE INVENTION

The present invention provides an image tracking device for tracking an object in a video. The image tracking device comprises an image capture interface, a storage means, and a processor means electrically connected to the image capture interface and the storage means. The image capture interface is configured to capture a picture frame from the video. The storage means has a multi-dimensional storage space. The multi-dimensional storage space is configured to store a plurality of first images. Each dimension of the multi-dimensional storage space is corresponding to a feature-related variance of a multi-dimensional variance. The processor means is configured to execute the operations of: marking a second image in the picture frame; calculating a multi-dimensional variance between the second image and each of the first images separately; determining whether the second image contains the object according to the multi-dimensional variance calculated; and if the second image is determined as one containing the object, storing the second image as one of the first images, in a specific subspace of the multi-dimensional storage space according to the multi-dimensional variance calculated.

In order to achieve the above and other objectives, the present invention further provides an image tracking method for tracking an object in a video. The image tracking method comprises the steps of:

(a) providing a storage means having a multi-dimensional storage space configured to store a plurality of first images, each dimension of the multi-dimensional storage space being corresponding to a feature-related variance of a multi-dimensional variance;

(b) capturing a picture frame from the video;

(c) marking a second image in the picture frame;

(d) calculating a multi-dimensional variance between the second image and each of the first images separately;

(e) determining whether the second image contains the object according to the multi-dimensional variance calculated; and (f) if the second image is determined as one containing the object, storing the second image as one of the first images, in a specific subspace of the multi-dimensional storage space according to the multi-dimensional variance calculated.

In conclusion, the present invention provides an image tracking device and an image tracking method thereof for tracking an object in a video. Various feature-related variances of the object in each of the picture frames of the video are integrated by the image tracking device and the image tracking method thereof in a vectorial manner to become a multi-dimensional variance which is used to determine whether a picture frame contains the object and which subspace of the multi-dimensional storage space should an "identified" image be stored.

With the image tracking device and the image tracking method thereof of the present invention, all the various feature-related variances of interests of the object in the video are memorized and learnt in a well-organized manner to thereby reduce the required time taken to track the object and thus prevent a waste of available resources. Accordingly, the present invention effectively overcomes a drawback of the conventional image tracking technologies, that is, failure to memorize and learn feature-related variances of an object in a video.

After making reference to the accompany drawings and the description of the embodiments of the present invention, persons skilled in the art gain insight into the technical solution and related embodiments of the present invention.

DETAILED DESCRIPTION OF THE EMBODIMENTS

The contents of the present invention can be explained according to the embodiments described hereunder, but the embodiments of the present invention are not intended to require that the present invention has to be implemented in any specific environment, application, or manner illustrated with the embodiments below. Hence, the embodiments below are illustrative, rather than restrictive, of the present invention. Components which are not directly related to the present invention are omitted from the embodiments below and thus are not shown in the accompany drawings. The accompanying drawings are not drawn to scale.

Figure 1:
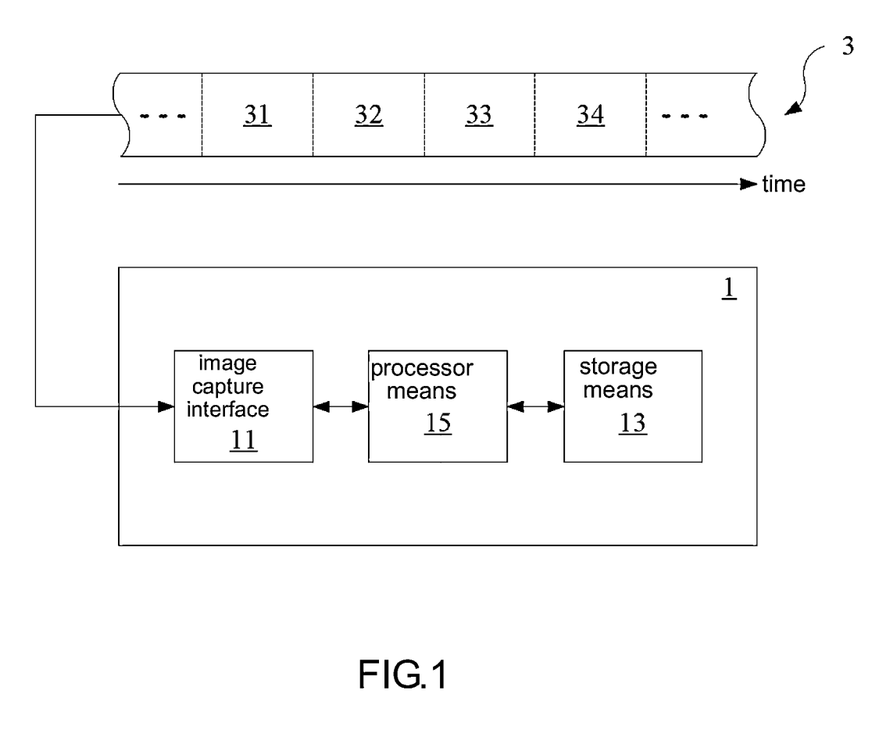
FIG. 1 is a structural schematic view of an image tracking device 1 according to the first embodiment of the present invention.

An image tracking device is provided according to a first embodiment of the present invention. Referring to FIG. 1, there is shown a structural schematic view of an image tracking device 1 according to the first embodiment of the present invention. As shown in FIG. 1, the image tracking device 1 comprises an image capture interface 11, a storage means 13, and a processor means 15. The processor means 15 is electrically connected to the image capture interface 11 and the storage means 13. The image tracking device 1 comes in various forms, including but not limited to a mobile phone, a digital camera, an event data recorder (EDR), a notebook computer, a tablet computer, and any device with an image capturing function.

The image tracking device 1 tracks an object in a video 3. The video 3 consists of a plurality of picture frames at different points in time, such as a picture frame 31, a picture frame 32, a picture frame 33, and a picture frame 34 shown in FIG. 1. At specific time intervals, the image capture interface 11 captures from the video 3 a plurality of picture frames, namely the picture frame 31, the picture frame 32, the picture frame 33, and the picture frame 34, in sequence. The quantity of the picture frames 31~34 in this embodiment is illustrative, rather than restrictive, of the present invention. Hence, in practice, the quantity of the picture frames of the video 3 is subject to changes. The arrangement and combination of the picture frames 31~34 of the video 3 as well as a way of capturing the picture frames from the video 3 by the image capture interface 11 are well known among persons skilled in the art and thus are not described in detail hereunder for the sake of brevity.

The storage means 13 has a multi-dimensional storage space, wherein the multi-dimensional storage spaces is configured to store a plurality of first images, and each dimension of the multi-dimensional storage space corresponds to a feature-related variance of a multi-dimensional variance. The multi-dimensional variance comprises a plurality of feature-related variances. The feature-related variances include but are not limited to a translation variance, a zooming variance, a blur variance, a rotation variance, a panning variance, a tilting variance, an illumination variance, and an occlusion variance. In another embodiment, the feature-related variances further include other variances of different types.

For the sake of illustration, the multiple dimensions of this embodiment are hereunder exemplified by two dimensions, but the two dimensions described hereunder are not restrictive of the present invention. Hence, the feasible embodiments of the present invention include three dimensions, four dimensions, five dimensions, and other multiple dimensions.

Figure 2:
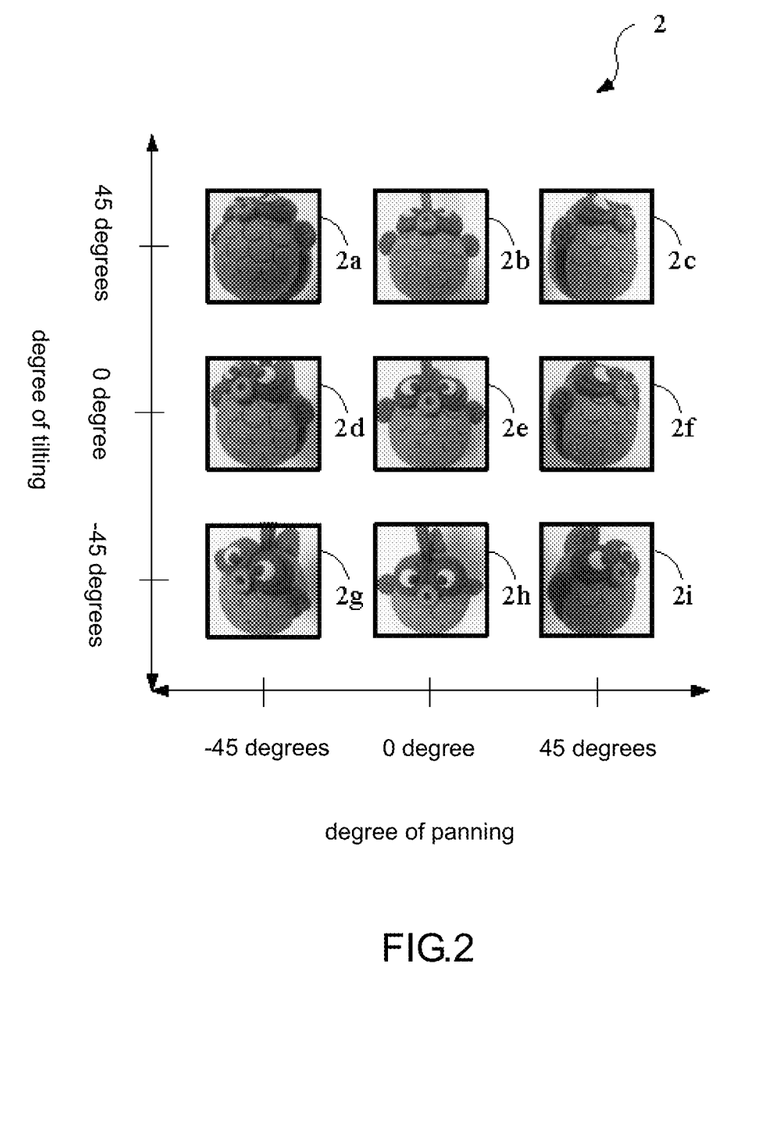
FIG. 2 is a schematic view of a two-dimensional storage space 2 of a storage means 13 according to the first embodiment of the present invention.

Referring to FIG. 2, there is shown a schematic view of a two-dimensional storage space 2 of the storage means 13 according to this embodiment of the present invention. As shown in FIG. 2, the storage means 13 has a two-dimensional storage space 2, and the two-dimensional storage space 2 corresponds to a two-dimensional variance, wherein the two-dimensional variance comprises two feature-related variances, namely a panning variance and a tilting variance (a vertical panning). The panning variance and the tilting variance in this embodiment are illustrative, rather than restrictive, of the present invention.

The two-dimensional storage space 2 of the storage means 13 stores a plurality of first images, including first image 2a, first image 2b, first image 2c, first image 2d, first image 2e, first image 2f, first image 2g, first image 2h, and first image 2i. For the sake of illustration, in this embodiment, the first images 2a~2i are expressed by (panning variance, tilting variance) in terms of two-dimensional variance. Referring to FIG. 2, the two-dimensional variances first of images 2a~2i with respect to image 2e may be expressed by (−45, 45), (0, 45), (45, 45), (−45, 0), (0, 0), (45, 0), (−45, −45), (0, −45), and (45, −45) in terms of panning/tilting angles.

In this embodiment, the quantity of the first images 2a~2i are illustrative, rather than restrictive, of the present invention. It is feasible for another embodiment to differ from this embodiment in the quantity of the first images 2a~2i and yet is regarded as a feasible embodiment of the present invention.

Graduations of the feature-related variances can be changed as needed. The quantity of subspace of the multi-dimensional storage space relates to the graduations of the feature-related variances. For example, in the present embodiment, if the panning variance has graduations spaced apart by 45 degrees, the 2-dimensional storage space may have eight subspaces for storing identified images of "eight kinds." Likewise, if the panning variance has graduations spaced apart by 30 degrees, the 2-dimensional storage space may have 12 subspaces for storing identified images of "12 kinds."

As regards a plurality of feature-related variances of the multi-dimensional variance, the graduations can vary from feature-related variance to feature-related variance. For example, the graduations of the panning variance index are spaced apart by 45 degrees, whereas the graduations of the tilting variance index are spaced apart by 30 degrees. Alternatively, the graduations of the panning variance index are spaced apart by 10 degrees, whereas the graduations of the tilting variance index are spaced apart by 20 degrees. Alternatively, the graduations of both the panning variance index and the tilting variance index are spaced apart by 60 degrees.

As mentioned earlier, at specific time intervals, the image capture interface 11 captures the picture frame 31, the picture frame 32, the picture frame 33, and the picture frame 34 in sequence from the video 3. The embodiment described hereunder is exemplified by the picture frame 32 captured from the video 3 by the image capture interface 11; hence, the picture frame 32 is illustrative, rather than restrictive, of the present invention.

Figure 3:
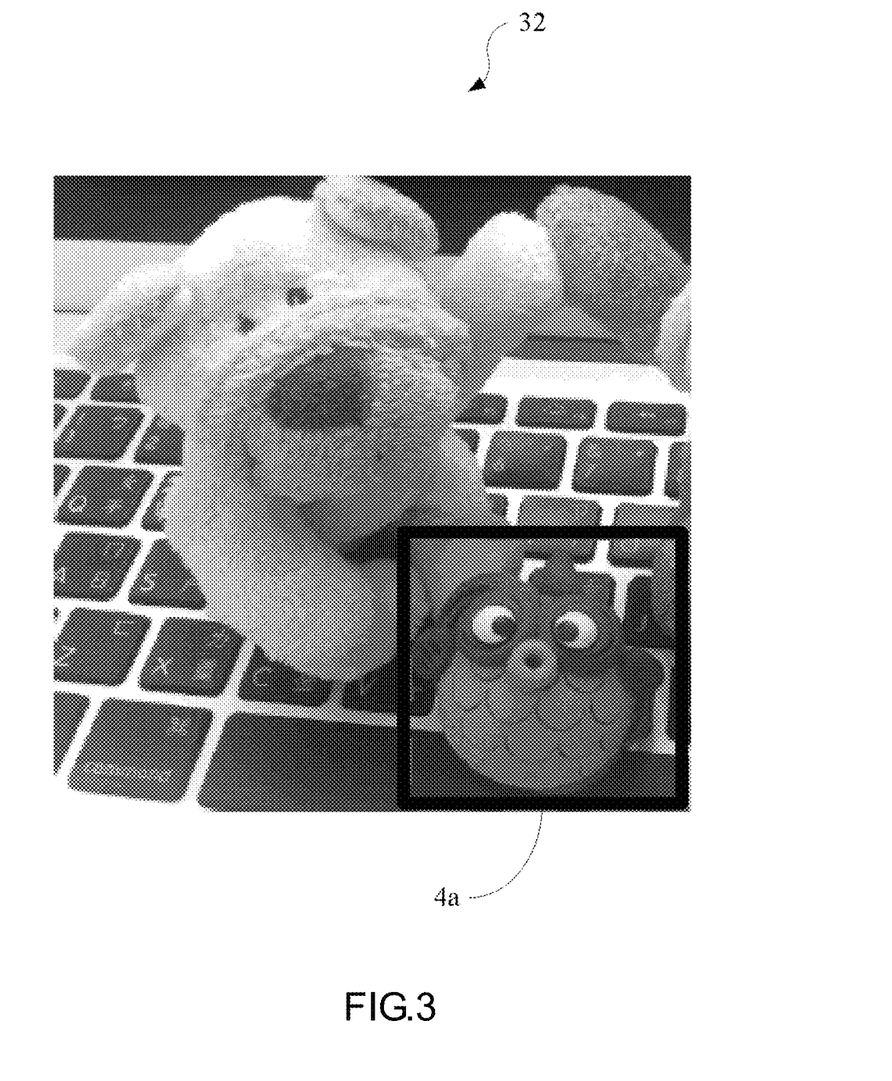
FIG. 3 is a schematic view of a picture frame 32 captured from a video 3 by an image capture interface 11 according to the first embodiment of the present invention.

Referring to FIG. 3, there is shown a schematic view of the picture frame 32 captured from the video 3 by the image capture interface 11 according to this embodiment. After the image capture interface 11 has captured the picture frame 32 from the video 3, the processor means 15 marks a second image 4a in the picture frame 32. In this embodiment, the processor means 15 defines one or more regions (not shown) in the picture frame 32 by means of a particle filter, maps a region image of each of the regions to an object image (e.g. first image 2e) of a tracked object, and thus marks the second image 4a in the picture frame 32. Despite its aforesaid disclosure, the present invention is not restricted to using the particle filter to define a plurality of regions in the picture frame 32. In another embodiment, the processor means 15 defines one or more regions in the picture frame 32 and marks the second image 4a by the other appropriate means, including but not limited to a Bayesian Filter and a Kalman Filter.

From the perspective of image tracking, the particle filter is capable of point tracking. That is to say, with the particle filter, a tracked object in a picture frame is expressed as a dot, and the position of the tracked object in different picture frames is continuously monitored according to different feature criteria, including but not limited to a color feature, an edge feature, an optical flow feature, or a texture feature of the tracked object. With the particle filter, the processor means 15 estimates the position of the tracked object in each of the picture frames (such as the picture frame 31, the picture frame 32, the picture frame 33, and the picture frame 34) of the video 3.

Take the picture frame 32 as an example, the processor means 15 defines a plurality of regions by means of the particle filter, then maps a region image of each of the regions to an object image of the tracked object to estimate the position of the tracked object in the picture frame 32, and eventually marks the second image 4a in the picture frame 32 accordingly. Hence, the second image 4a occupies the probable position of the tracked object in the picture frame 32. A way of marking the second image 4a in the picture frame 32 by the processor means 15 using the particle filter is well known among persons skilled in the art and thus is not described in detail herein for the sake of brevity.

After the processor means 15 has marked the second image 4a in the picture frame 32, the processor means 15 calculates a multi-dimensional variance between the second image 4a and each of the first images 2a~2i separately and then determines whether the second image 4a is the tracked object according to the multi-dimensional variances. Afterward, after determining that the second image 4a contains the tracked object, the processor means 15 stores the second image 4a as one of the first images in a specific subspace (e.g. the subspace in which the first image 2e is stored) of the multi-dimensional storage space of the storage means 13 according to the multi-dimensional variances calculated.

The multi-dimensional variance comprises a plurality of a plurality of feature-related variances. Each of feature-related variances may be selected from the group consisting of a translation variance, a zooming variance, a blur variance, a rotation variance, a panning variance, a tilting variance, an illumination variance, and an occlusion variance. In principle, in this embodiment, the multi-dimensional variance matches the multi-dimensional variance. Since the two-dimensional storage spaces 2 of the storage means 13 only correspond to a panning variance and a tilting variance, the multi-dimensional variance comprises the panning variance and the tilting variance only. Hence, the processor means 15 calculates the panning variance and the tilting variance between the second image 4a and each of the first images 2a~2i separately.

In nature, the second image 4a may comprise a plurality of second features, whereas the first images 2a~2i each comprise a plurality of first features. The processor means 15 compares the second features of the second image 4a with each of the first features of the first images 2a~2i, respectively, to thereby calculate one or more feature-related variances (e.g. a panning variance and a tilting variance) between the second image 4a and each of the first images 2a~2i. The second features of the second image 4a or the first features of each of the first images 2a~2i include but are not limited to a depth feature, a temperature feature, a color feature, an edge feature, an optical flow feature, or a texture feature.

The processor means 15 calculates the second features of the second image 4a or the first features of each of the first images 2a~2i with a feature detection algorithm and a feature description algorithm.

The feature detection algorithm includes but is not limited to FAST algorithm, Maximally Stable Extremal Region (MSER) algorithm, STAR algorithm, Difference of Gaussians (DoG) algorithm, Harris algorithm, Hessian algorithm, GoodFeatureToTrac (GFTT) algorithm, Harris-Affine algorithm, or Hessian-Affine algorithm.

The feature description algorithm includes but is not limited to Scale-Invariant Feature Transform (SIFT) algorithm, Affine Scale-Invariant Feature Transform (A-SIFT) algorithm, Speeded-Up Robust Features (SURF) algorithm, or binary robust independent elementary features (BRIEF) algorithm.

Optionally, the processor means 15 sets a variance threshold value for use in determining whether the second image 4a is the tracked object, wherein the variance threshold value corresponds to the multi-dimensional variance. Hence, as described above, the variance threshold value comprises a panning variance threshold and a tilting variance threshold.

If no multi-dimensional variance between the second image 4a and any one of the first images 2a~2i matches the preset variance threshold value, the processor 15 means will determine that the second image 4a does not contain the tracked object. Then, the processor means 15 will mark another second image in the picture frame 32 anew and calculate the panning variance and the tilting variance between the another second image and each of the first images 2a~2i again.

Conversely, if a multi-dimensional variance (e.g. a panning variance and a tilting variance) between the second image 4a and at least one of the first images 2a~2i matches the preset variance threshold value, the processor means 15 will determine that the second image 4a marked in the picture frame 32 contains the tracked object. If the determination is affirmative, it will mean that the processor 15 means has already tracked the object in the picture frame 32. Afterward, after determining that the second image 4a as containing the tracked object, the processor means 15 stores in the two-dimensional storage spaces 2 of the storage means 13 the second image 4a as one of the first images according to the multi-dimensional variance calculated (i.e., the panning variance and the tilting variance with respect to a standard image containing the object, e.g. first image 2e).

Understandably, the objective of the present invention and other objectives can be achieved, regardless of whether the panning variance threshold value and the tilting variance threshold value are set to be identical or different. For example, the processor means 15 can set the panning variance threshold value to 10 degrees and the tilting variance threshold value to 5 degrees. Alternatively, the processor means 15 can set the panning variance threshold value to 8 degrees and the tilting variance threshold value to 14 degrees. Alternatively, the processor means 15 can set both the panning variance threshold value and the tilting variance threshold value to 10 degrees.

For example, presumably, the processor means 15 sets both the panning variance threshold value and the tilting variance threshold value to 10 degrees, whereas the panning variance and the tilting variance between the second image 4a and the first image 2e is 5 degrees and 0 degree, respectively. After calculating the panning variance and the tilting variance between the second image 4a and each of the first images 2a~2i, respectively, the processor means 15 will determine that the multi-dimensional variance between the second image 4a and the first image 2e matches the preset variance threshold value.

In doing so, the processor means 15 determines that the second image 4a contains to the tracked object. Then, the processor means 15 stores in the two-dimensional storage space 2 of the storage means 13 the second image 4a as one of the first images according to the multi-dimensional variance (i.e., the panning variance and the tilting variance) between the second image 4a and first image 2e.

In nature, the second image 4a may have a second pixel size, and the first images 2a~2i have the same first pixel size. If the second pixel size of the second image 4a does not equal the first pixel size of the first images 2a~2i, the processor means 15 may change the pixel size of the second image to the first pixel size and then calculate the feature-related variances (including the panning variance and the tilting variance) between the second image 4a and each of the first images 2a~2i to thereby enhance the overall tracking accuracy.

After making reference to the above descriptions, persons skilled in the art can easily come up with an embodiment of a higher dimension. Presumably, in addition to the panning variance and the tilting variance, an illumination variance is introduced. Then, the storage means 13 comprises a three-dimensional storage space, wherein the three-dimensional storage space is configured to store a plurality of first images and corresponds to a three-dimensional variance. The three-dimensional variance comprises three feature-related variances, namely a panning variance, a tilting variance, and an illumination variance.

The processor means 15 calculates a three-dimensional variance between a second image and each of the first images. The three-dimensional variance comprises three feature-related variances, namely a panning variance, a tilting variance, and an illumination variance. Then, the processor means 15 determines whether the second image contains the tracked object according to the three-dimensional variances. If the determination is affirmative, the processor means 15 will store in the three-dimensional storage spaces 2 of the storage means 13 the second image 4a as one of the first images according to the three-dimensional variance calculated. Likewise, due to the aforesaid disclosure, any embodiments of four dimensions, five dimensions, or any other higher multiple dimensions are feasible.

The second embodiment of the present invention illustrates an image tracking method which may be implemented by means of the image tracking device 1 of the first embodiment. Hence, in the second embodiment, an image capture interface, a storage means, and a processor means which are described below are deemed the image capture interface 11, the storage means 13, and the processor means 15 of the first embodiment.

In another aspect, the present invention provide a image tracking method for tracking an object in a video, the image tracking method comprising the steps of: (a) providing a storage means having a multi-dimensional storage space configured to store a plurality of first images, each dimension of the multi-dimensional storage space being corresponding to a feature-related variance of a multi-dimensional variance; (b) capturing a picture frame from the video; (c) marking a second image in the picture frame; (d) calculating a multi-dimensional variance between the second image and each of the first images separately; (e) determining whether the second image contains the object according to the multi-dimensional variance calculated; and (f) if the second image is determined as one containing the object, storing the second image as one of the first images, in a specific subspace of the multi-dimensional storage space according to the multi-dimensional variance calculated.

In one embodiment of the present invention, the second image has a second pixel size, and the first images have a same first pixel size, and wherein the step (d) comprises a sub-step of: (d1) changing the pixel size of the second image to the first pixel size before calculating the multi-dimensional variance between the second image and each of the first images.

According to the present invention, the step (c) may comprise a sub-step of:

(c1) defining a plurality of regions in the picture frame and mapping a region image of each of the regions to an object image of the object. The step (c) may further comprises a sub-step of: (c0) defining, by a particle filter, a plurality of regions in the picture frame.

According to the present invention, the multi-dimensional variance comprises a plurality of feature-related variances. Each of feature-related variances may be selected from the group consisting of a translation variance, a zooming variance, a blur variance, a rotation variance, a panning variance, a tilting variance, an illumination variance, and an occlusion variance.

In certain embodiments of the present invention, the second image comprises a plurality of second features, and the first images each comprise a plurality of first features, wherein the step (d) comprises a sub-step of: (d2) comparing the second features of the second image and the first features of a first image to thereby calculate one or more feature-related variances between the second image and the first image.

According to the present invention, each of the second features or each of the first features may be selected from the group consisting of a depth feature, a temperature feature, a color feature, an edge feature, an optical flow feature, and a texture feature. Further, the second features of the second image or the first features of the first image(s) may be calculated by a feature detection algorithm and a feature description algorithm.

Figure 4:
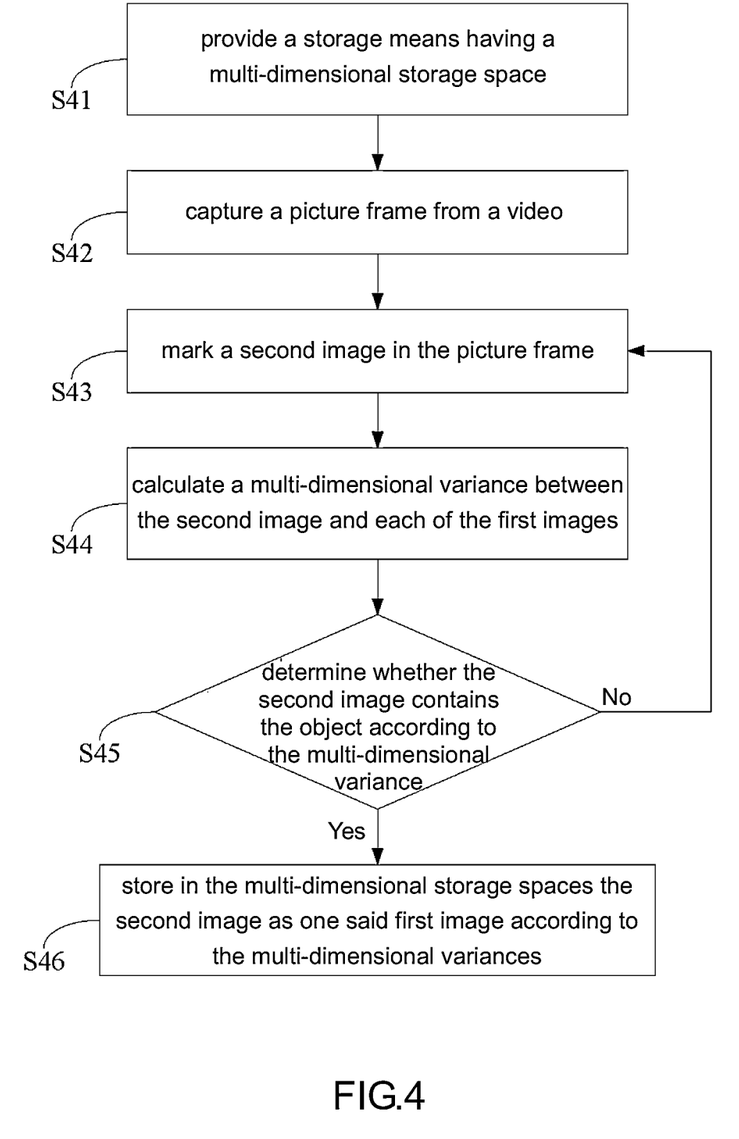
FIG. 4 is a flowchart of an image tracking method according to the second embodiment of the present invention.

Referring to FIG. 4, there is shown a flowchart of an image tracking method according to an embodiment of the present invention. As shown in FIG. 4, in step S41, a storage means is provided, wherein the storage means have a multi-dimensional storage space configured to store a plurality of first images, each dimension of the multi-dimensional storage space being corresponding to a feature-related variance of a multi-dimensional variance. In step S42, the image tracking method of this embodiment enables an image capture interface to capture a picture frame from a video. In step S43, the image tracking method of this embodiment enables a processor means to mark a second image in the picture frame, wherein the processor means is electrically connected to the image capture interface and the stock. In another embodiment, step S43 is the step in which the processor means defines a plurality of regions in the picture frame with a particle filter, and maps a region image of each of the regions to an object image of the object to thereby mark the second image.

In step S44, the image tracking method of this embodiment enables the processor means to calculate a multi-dimensional variance between the second image and each of the first images. In nature, the second image may have a second pixel size, and the first images have the same first pixel size. Optionally, step S44 can be the step in which, after changing the second pixel size of the second image to the first pixel size, the processor calculates each of the multi-dimensional variances between the second image and each of the first images.

In nature, the second image comprises a plurality of second features, and the first images each comprise a plurality of first features. Optionally, step S44 is the step in which the processor compares the second features of the second image with the first features of each of the first images, respectively, to thereby calculate each of the multi-dimensional variances between the second image and each of the first images.

In another embodiment, step S44 is the step in which, after changing the second pixel size of the second image to the first pixel size, the processor compares the second features of the second image with the first features of each of the first images, respectively, to thereby calculate each of the multi-dimensional variances between the second image and each of the first images.

In step S45, the image tracking method of this embodiment enables the processor to determine whether the second image is attributed to the object according to the multi-dimensional variances. If the determination is affirmative, the process flow will go to step S46, otherwise the process flow will go back to step S43. In step S46, the image tracking method of this embodiment enables the processor to store in the multi-dimensional storage spaces of the stock the second image as a first image according to the multi-dimensional variances.

In addition to the aforesaid steps, the image tracking method of this embodiment involves executing all the operations of the image tracking device in the first embodiment and thus comes with all the functions corresponding thereto. Furthermore, persons skilled in the art can directly understand how the aforesaid operations and functions can be executed with the image tracking method of this embodiment in view of the disclosure contained in the first embodiment.

In yet another embodiment, the image tracking method of this embodiment can be executed with a computer program product. As soon as the computer program product is loaded onto a computer device or the image tracking device 1 of the first embodiment, the device executes a plurality of program instructions included in the computer program product, wherein the program instructions correspond in function/purpose to all the steps of the image tracking method of this embodiment. The computer program product is stored in a non-transitory machine readable medium, including but not limited to Read Only Memory (ROM), flash memory, floppy disk drive, hard disk drive, CD-ROM, USB flash drive, magnetic tape, database accessible online, or any other storage media well known among persons skilled in the art and having the aforesaid functions.

In conclusion, the present invention provides an image tracking device and an image tracking method thereof for tracking an object in a video. Various feature-related variances of the object in each of picture frames of the video are integrated by the image tracking device and the image tracking method thereof to become a multi-dimensional variance which is then stored in a vectorial spatial manner in a corresponding multi-dimensional storage space. The image tracking device and the image tracking method thereof are further characterized in that the object in the video is tracked according to a plurality of multi-dimensional variances stored in a plurality of multi-dimensional storage spaces.

According to the present invention, various feature-related variances of an object in a video are memorized and learnt in a well-organized manner to thereby reduce the required time taken to track the object and thus prevent a waste of available resources. Hence, the present invention effectively overcomes a drawback of the conventional image tracking technologies, that is, failure to memorize and learn feature-related variances of an object in a video.

The disclosure contained in the above embodiments is only illustrative of part of the implementation aspects of the present invention and descriptive of the technical features of the present invention rather than restrictive of the scope of substantive protection to be given to the present invention. Hence, changes or equivalent arrangements which can be easily made to the above embodiments by any persons skilled in the art should fall within the scope of the claims of the present invention. Accordingly, the legal protection for the present invention should be defined by the appended claims.

What is claimed is:

1. An image tracking device for tracking an object in a video, which comprises:
    an image capture interface for capturing a picture frame from the video;
    a storage means having a multi-dimensional storage space configured to store a plurality of first images, each dimension of the multi-dimensional storage space being corresponding to a feature-related variance of a multi-dimensional variance; and
    a processor means electrically connected to the image capture interface and the storage means and configured to execute the operations of:
    marking a second image in the picture frame;
    calculating a multi-dimensional variance between the second image and each of the first images separately;
    determining whether the second image contains the object according to the multi-dimensional variance calculated; and
    if the second image is determined as one containing the object, storing the second image as one of the first images, in a specific subspace of the multi-dimensional storage space according to the multi-dimensional variance calculated.

2. The image tracking device of claim 1, wherein each of the first images has a same first pixel size, and the second image has a second pixel size, and the processor means calculates each of the multi-dimensional variances between the second image and each of the first images after changing the pixel size of the second image to the first pixel size.

3. The image tracking device of claim 1, wherein the processor means defines a plurality of regions in the picture frame, and maps a region image of each of the regions to an object image of the object to thereby mark the second image.

4. The image tracking device of claim 3, wherein the processor means defines a plurality of regions in the picture frame by means of a particle filter.

5. The image tracking device of claim 1, wherein the multi-dimensional variance comprises a plurality of feature-related variances.

6. The image tracking device of claim 1, wherein each of feature-related variances is selected from the group consisting of a translation variance, a zooming variance, a blur variance, a rotation variance, a panning variance, a tilting variance, an illumination variance, and an occlusion variance.

7. The image tracking device of claim 1, wherein the second image comprises a plurality of second features, and the first images each comprises a plurality of first features, and wherein the processor means compares the second features of the second image with the first features of the first image to thereby calculate one or more feature-related variances between the second image and the first image.

8. The image tracking device of claim 7, wherein each of the second features or each of the first features is selected from the group consisting of a depth feature, a temperature feature, a color feature, an edge feature, an optical flow feature, and a texture feature.

9. The image tracking device of claim 7, wherein the processor means calculates the second features of the second image or the first features of the first image(s) by a feature detection algorithm and a feature description algorithm.

10. An image tracking method for tracking an object in a video, the image tracking method comprising the steps of:
- (a) providing a storage means having a multi-dimensional storage space configured to store a plurality of first images, each dimension of the multi-dimensional storage space being corresponding to a feature-related variance of a multi-dimensional variance;
- (b) capturing a picture frame from the video;
- (c) marking a second image in the picture frame;
- (d) calculating a multi-dimensional variance between the second image and each of the first images separately;
- (e) determining whether the second image contains the object according to the multi-dimensional variance calculated; and
- (f) if the second image is determined as one containing the object, storing the second image as one of the first images, in a specific subspace of the multi-dimensional storage space according to the multi-dimensional variance calculated.

11. The image tracking method of claim 10, wherein the second image has a second pixel size, and the first images have a same first pixel size, and wherein the step (d) comprises a sub-step of:
- (d1) changing the pixel size of the second image to the first pixel size before calculating the multi-dimensional variance between the second image and each of the first images.

12. The image tracking method of claim 10, wherein the step (c) comprises a sub-step of:
- (c1) defining a plurality of regions in the picture frame and mapping a region image of each of the regions to an object image of the object.

13. The image tracking method of claim 12, wherein the step (c) further comprises a sub-step of:
- (c0) defining, by a particle filter, a plurality of regions in the picture frame.

14. The image tracking method of claim 10, wherein the multi-dimensional variance comprises a plurality of feature-related variances.

15. The image tracking method of claim 10, wherein each of feature-related variances is selected from the group consisting of a translation variance, a zooming variance, a blur variance, a rotation variance, a panning variance, a tilting variance, an illumination variance, and an occlusion variance.

16. The image tracking method of claim 10, wherein the second image comprises a plurality of second features, and the first images each comprise a plurality of first features, wherein the step (d) comprises a sub-step of:
- (d2) comparing the second features of the second image and the first features of a first image to thereby calculate one or more feature-related variances between the second image and the first image.

17. The image tracking method of claim 16, wherein each of the second features or each of the first features is selected from the group consisting of a depth feature, a temperature feature, a color feature, an edge feature, an optical flow feature, and a texture feature.

18. The image tracking method of claim 16, the second features of the second image or the first features of the first image(s) are calculated by a feature detection algorithm and a feature description algorithm.

* * * * *